(12) United States Patent
Rahman et al.

(10) Patent No.: US 11,144,559 B2
(45) Date of Patent: Oct. 12, 2021

(54) CUSTOMIZED SEARCH RESULT RANKING BASED ON USER GROUPS

(71) Applicant: eBay Inc., San Jose, CA (US)

(72) Inventors: Mahmuda Rahman, Campbell, CA (US); Ishita Singh, San Francisco, CA (US)

(73) Assignee: EBAY INC., San Jose, CA (US)

( * ) Notice: Subject to any disclaimer, the term of this patent is extended or adjusted under 35 U.S.C. 154(b) by 133 days.

(21) Appl. No.: 16/525,094

(22) Filed: Jul. 29, 2019

(65) Prior Publication Data

US 2021/0034631 A1 Feb. 4, 2021

(51) Int. Cl.
*G06F 16/00* (2019.01)
*G06F 16/2457* (2019.01)
*G06F 16/9536* (2019.01)
*G06F 16/9535* (2019.01)

(52) U.S. Cl.
CPC .... *G06F 16/24578* (2019.01); *G06F 16/9535* (2019.01); *G06F 16/9536* (2019.01)

(58) Field of Classification Search
CPC ........... G06F 16/24578; G06F 16/9535; G06F 16/9536
See application file for complete search history.

(56) References Cited

U.S. PATENT DOCUMENTS

| 8,005,823 | B1 | 8/2011 | Marshall et al. |
| 8,843,481 | B1 | 9/2014 | Xu |
| 2002/0143759 | A1 | 10/2002 | Yu |
| 2015/0081679 | A1* | 3/2015 | Gyanchand ......... G06F 16/3322 707/723 |

* cited by examiner

*Primary Examiner* — Hung Q Pham
(74) *Attorney, Agent, or Firm* — Shook, Hardy & Bacon L.L.P.

(57) ABSTRACT

A search engine provides customized search results in response to a search query using a group search ranker. The customized search results may be determined for a user based on the user's association with a user group having common preferences. Preferences for users may be learned through historical user information that includes interactions by users with websites on the Internet. Users may be grouped based on these preferences, and the user group may have an associated group search ranker. When the user enters a search query at a search engine, the search engine may identify a user group and retrieve the group search ranker. The group search ranker may be used to rank relevant search results identified based on the search query. The ranked search results may be provided for presentation to a user at a user computing device.

18 Claims, 6 Drawing Sheets

CUSTOMIZED SEARCH RESULT RANKING BASED ON USER GROUPS

BACKGROUND

Conventional search systems receive a search query and provide search results in response. Search systems often index information for an extraordinary large number of items (e.g., documents, images, products, etc.) that can be returned as search results to search queries. Given the significantly large number of items, it is important to determine how relevant an item is to a search query when providing indexed search results to a user. Otherwise, the user is provided with meaningless search results that make it virtually impossible to locate the relevant results among the large number of search results returned to the user. This forces the user to repeatedly attempt different search queries to try to identify the relevant results and forces search engines to transmit more data than necessary to the user, adding to network traffic, exhausting virtual resources, and decreasing available internet bandwidth.

SUMMARY

At a high level, aspects described herein relate to a search engine that customizes search results in response to search queries by employing group search rankers. User groups are formed, where each user group is identified based on a common preference of users learned from historical user interactions. A group search ranker is associated with each user group. Each group search ranker is configured to rank search results to emphasize the common preference of users in the user group.

When the search engine receives a search query from a user device of a user, the search engine identifies a user group for the user from among a plurality of user groups. The search engine may identify the user group based on a preference of the user corresponding to the common preference of users in the user group. Based on identifying the user group for the user submitting the search query, the search engine employs the group search ranker associated with the identified user group to rank search results for the search query.

By customizing search results using group search rankers, the search engine provides more relevant search results to a user. The more relevant search results are provided with a higher rank than less relevant results, increasing the chance the user will locate them among a large number of search results for a given search query. Also, by using group search rankers, the search engine is able to more likely present relevant results having a higher rank on an individual level, since what is relevant to one person may not be relevant to another. In this way, users are less likely to repeatedly enter search queries to attempt to find a particular search result, which may have previously been provided to them but ranked so low that it would be near impossible for the user to locate it. Further, by identifying more relevant search results and ranking them higher, the search engine itself does not have to communicate as much data over the Internet, thus improving network bandwidth, reducing the number of virtual resources used, and increasing available bandwidth.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
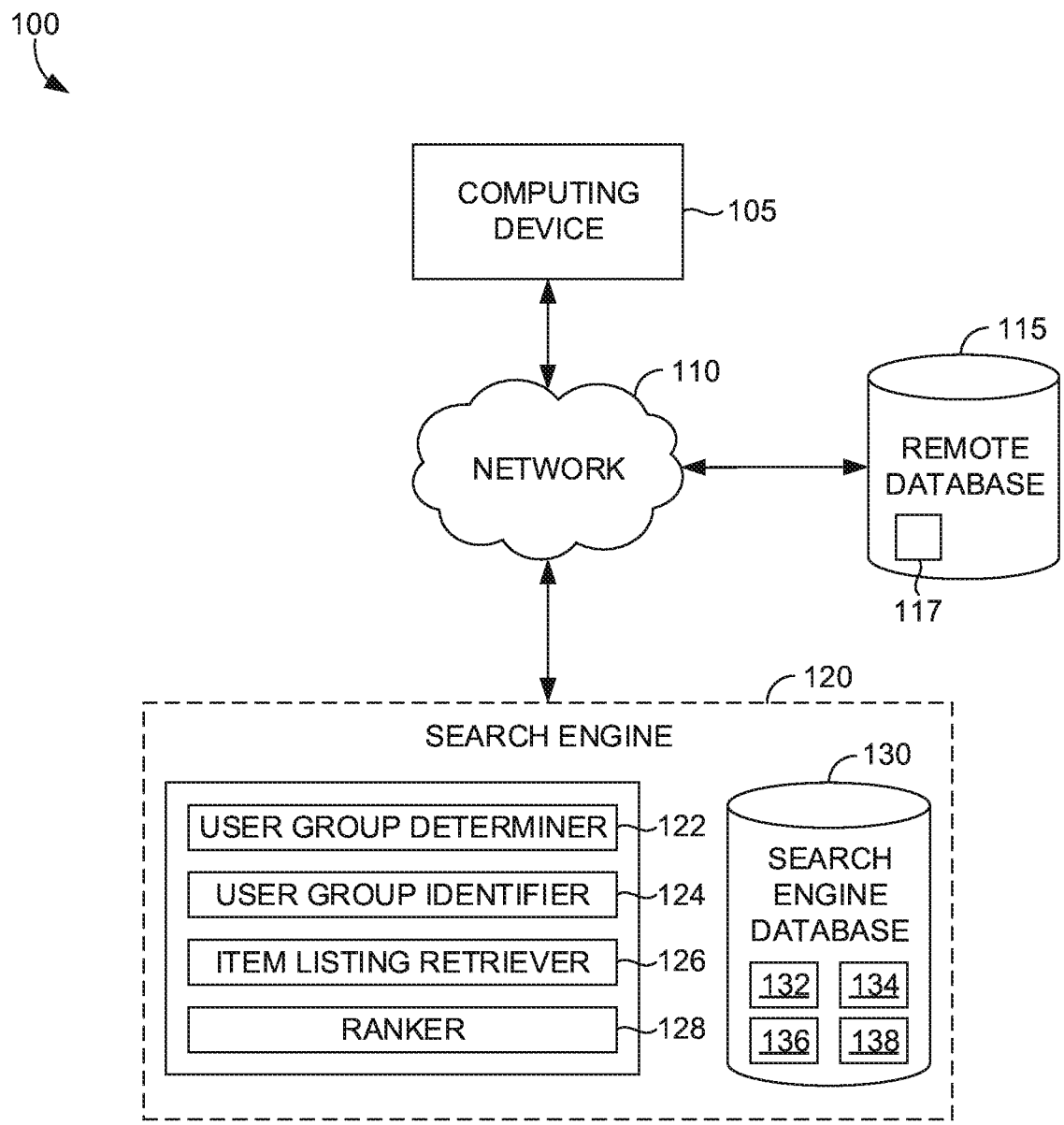
FIG. 1 is an example search system in which implementations of the present disclosure may be employed.

As previously mentioned, online search engines provide search results in response to a search query. The search results may comprise "item listings," which generally include any search result for an "item." In this case, an "item" may be any piece of information available on the Internet that may be accessible to a search engine, such as products, images, services, webpages, videos, etc. Current search engines provide an extraordinarily large number of these item listings when a user enters a search query. The primary reason for this is the universal connectivity of the Internet, itself. As more information is stored and available, the number of potential item listings available for a given search query continues to grow. Thus, it becomes more and more important to identify the most relevant item listings, and of those item listings, rank them in a manner where the user is able to locate a particular item listing that is most relevant to that specific user.

The problem, however, is that current search systems use a universal ranker, meaning they use the same ranker to identify, rank, and provide item listings to a user. As the sheer amount of online information grows, these traditional universal rankers begin to provide users with item listings that are relevant to the search query, while item listings that are more relevant to the user's intent might be provided so far down a ranked list, the user would never be able to locate them. To compensate, users are forced to resubmit queries, while search engines are forced to retrieve and provide more information than necessary. This leads to many of the problems previously discussed, such as increasing network traffic, increasing the amount of virtual resources used, and increasing network bandwidth.

Embodiments of the technology disclosed herein relate to a search engine that solves these challenges by customizing search results using group search rankers. Each group search ranker is associated with a user group and is configured to rank item listings for items to emphasize a preference of users in the user group. When the search engine receives a search query from a user, the search engine identifies a user group for the user. A group search ranker associated with the identified user group is then used by the search engine to rank a set of item listings. The search engine provides the set of item listings ranked using the group search ranker as search results for the search query. In this way, the search results are not ranked using a generic ranker, but instead using a group search ranker such that the rankings reflect a preference of the user based on the user belonging to a particular user group.

Each user group can be formed from a plurality of users based on historical user actions, such as user actions performed by users interacting with item listings provided as search results in past search sessions. In some configurations, the user groups may be formed based on preferences of users associated with items exhibited by the historical user actions. For instance, the user group may be formed of a plurality of users that have a common preference for an item having a particular attribute.

In some instance, the item attribute could be an item listing classification option. More particularly, item listings are sometimes categorized. A category associated with an item listing may be referred to as an "item listing classification." An item listing classification generally includes any subdivisible, descriptive aspect of the item listing. For example, an item listing may be categorized by condition or format. That is, the condition of the item described by the item listing may be new or used, while the format of the item listing may be an auction or a fixed price. These subdivided components of the item listing classification may be referred to as "item listing classification options" (e.g, new or used, auction or fixed price). Said differently, the users within the group may each have an identified historical pattern of interacting with an item listing when the item listing includes a particular item listing classification option. Thus, a user may be said to "prefer" a particular item listing classification option, and these preferences may indicate how the user interacts with item listings in the future.

As an example to illustrate, some users may prefer to purchase an item that is sold as new. Thus, these users having a preference for new items may be included in a user group that includes members having a preference for new items. Similarly, users having a preference for purchasing items sold through an auction may be included in a user group that includes members having a preference for auction items.

The search engine may include a plurality of user groups, where each user group is associated with one or more item listing classification options. Each user group may also be associated with a group search ranker. That is, a group search ranker may be based on a user group. As will be described in further detail below, each group search ranker is configured to rank results in accordance with the preference of users within the user group associated with each group ranker.

As indicated above, the search engine identifies a user group for a user when receiving a search query from the user. In some instance, the user group for the user may be determined by looking up membership of user groups stored by the search engine to identifying a user group to which the user belongs. In other instance, historical data for the user can be compared to identifying a preference for the user that matches a preference associated with a particular user group, and that user group identified. There may be instances where there is not enough historical data to determine a preference of the user. Such cases may arise when the user first interacts with the search engine. In these cases, user attributes for the user may be identified, such as by accessing a user profile; determining user attributes through information locally stored by the user, such as cookies; or any other method. Further, attributes of group members may also be determined. The user may be attributed to a group where a significant number of group members have the same attribute as the user. For example, a statistically significant number of members of a group having a preference for new items may have an age attribute of "30-40." Thus, if the age of the user is known, and corresponds to the age attribute 30-40, the user may be attributed to the group having the preference for the new items. In some cases, the user may be temporarily attributed to a group based on a user attribute until enough historical information is available to attribute the user to a group based on an item listing classification option.

The group search ranker generally ranks identified search results for presentation to the user. To rank a set of search results, the group search ranker applies a weight to the set of search results based on the item listing classification option of the user group. The group search ranker may be weighted to emphasize the item listing classification option when ranking search results within the set of search results. For example, search results identified for a search query may include item listings having various item listing classification options, such as a first item listing being an auction, while a second item listing is a fixed price. The group search ranker may be based on a user group that comprises users having a preference for auction items. Thus, this group's group search ranker may be weighted to emphasize item listings under auction over item listings having a fixed price. By applying the group search ranker to the set of search results, the item listings under auction may be ranked higher than the item listings that have fixed prices, in accordance with the weight.

Having applied the group search ranker to the set of search results, the ranked search results may be provided to the user at the computing device, and presented to the user on a GUI of the computing device. The ranked search results may be provided to the user in response to the search query entered by the user. From the perspective of the user, the user is provided with a ranked set of search results that includes search results the user is more likely to interact with ranked higher than search results the user is less likely to interact with. Thus, search results are identified and presented to a user with more relevant search results being presented higher in the order of the ranked set.

While the present technology is presented in the context of a search engine for returning items that may be purchased by the user, it will be recognized that this is only one example use scenario in which the described technology may be employed. One of ordinary skill in the art will appreciate that the underlying technical methods described herein for recalling, ranking, and providing information in response to an Internet search query are applicable across many different contexts. It is impractical to describe all of the various contexts in which the technology can be employed. Thus, for simplicity and consistency, the technology will continue to be described in the context of e-commerce.

In view of this, it should become apparent that the technology of this application solves problems that are rooted in and arise from the use of the Internet. Locating information stored at various connected servers and effectively presenting it to a user is a technological challenge and limitation of the Internet. The use of the Internet is only as good as the ability to locate desired information stored at one computing device and remotely recall that information for presentation at another computing device.

For example, at the time of filing, a search result for "Taylor Swift Music" entered into Bing produced roughly 59.3 Million search results. To effectively navigate and use the Internet, it is not simply enough to identify and recall search results that include or link to information stored on Internet-connected devices or servers. Instead, ranking the identified and recalled information is also essential to the functioning of the Internet and a user's ability to use the Internet to identify vast amounts of information stored at an innumerable number of remote servers. Thus, out of the 59.3 Million search results for "Taylor Swift Music," the more relevant results should be identified from the group and ranked the highest when presented to the user, else it would be impossible for the user to locate the relevant results among the number of identified search results. However, this problem is compounded because the relevance of the search results is dependent on, not just the content of the information, but also on the intent or preferences of the user searching the Internet, as well.

The technology described herein provides solutions to these problems. For instance, by placing the user into user groups based on a user preference, the search engine can apply a search ranker for the group to an identified set of search results as opposed to the search engine employing a generic search ranker. Thus, the search engine provides members of this group with search results that are more relevant based on their membership in the group. In contrast, the search engine can present a different user in a different group with item listings that are more relevant to the different user. As such, the search engine provides search results to each user that may be different based on their membership in different groups. In doing so, the search engine provides the users with relevant item listings recalled from one or more various Internet-connected servers, and are able to effectively utilize the Internet. Based on this, the search engine receives fewer queries, since users are more likely to be provided and find the search results relevant to that particular user. There is more available computational processing power available for the search engine to perform other tasks. Further, network bandwidth, and overall Internet traffic generally, is reduced, since less data is being transmitted over the network.

Turning now to FIG. 1, an example search system 100 is illustrated in which implementations of the present disclosure may be employed. In particular, FIG. 1 illustrates a high level architecture of search system 100 having components in accordance with implementations of the present disclosure.

Regarding search system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number and are not to be construed as limiting for all implementations of the present disclosure. The functionality of search system 100 can be further described based on the functionality and features of the previously-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

Among other components or engines not shown, search system 100 includes computing device 105. Computing device 105 is shown communicating using network 110 to search engine 120, which may also communicate to remote database 115. The components of search system 100 may communicate with each other over one or more networks (e.g., public network or virtual private network "VPN") as shown with network 110. Network 110 may include, without limitation, one or more local area networks (LANs) wide area networks (WANs), or any other communication network or method. Computing device 105 may be a client computing device that corresponds to the computing device described herein with reference to FIG. 6.

Search engine 120 is illustrated as including user group determiner 122, user group identifier 124, item listing retriever 126, and ranker 128. Search engine 120 also includes search engine database 130.

Search engine database 130 (and similarly remote database 115) generally stores information including data, computer instructions (e.g., software program instructions, routines, or services), or models used in embodiments of the described technologies. Although depicted as a single database component, search engine database 130 may be embodied as one or more data stores or may be in the cloud. Search engine 120 may communicate with other components of search system 100 using network 110.

As noted, search engine 120 comprises user group determiner 122. In general, user group determiner 122 forms user groups from a plurality of users. The users may be a plurality of users of search engine 120.

To form user groups, user group determiner 122 uses historical user information 132. Historical user information 132 may be collected by search engine 120 when a user interacts with search engine 120. For example, a user may enter a search query, select search results, purchase an item in an item listing provided as a search result, flag a search result, share a search result with another person, identify an item listing provided as a search result for a potential purchase, or any other interaction the user may have with search engine 120.

Other historical user information 132 may be collected by search engine 120 from any other source, such as receiving user information from remote database 115 or computing device 105. For example, remote database 115 may be another website other than search engine 120 with which the user interacts. The interactions may be received by search engine 120 from the website associated with remote server 115 and may be stored in search engine database 130 as historical user information 132.

Other sources of historical user information 132 may include user computing device 105 and the user, itself. For example, user computing device 105 may include cookies or other forms of stored information regarding interactions the user has had with a website associated with remote server 115 or search engine 120. These may be received by search engine 120 and stored as historical user information 132.

User group determiner 122 determines user preferences within historical user information 132. The determined preferences may be associated with an item listing classification option for an item listing classification.

To determine user preferences, in the context of e-commerce, user group determiner 122 may identify prior purchases or indications of a potential purchase of an item within the historical user information. User group determiner 122 may identify item listing classification options within the item listings for the items identified in the historical user data. User group determiner 122 may identify the item listing classification option that is associated with purchased or potentially purchased item.

User group determiner 122 may identify patterns among the item listing classification options of the purchased or potentially purchased items in the historical user information 132. Patterns of historic purchases of items associated with a particular item listing classification option may indicate a preference for the user to purchase items based on the particular item listing classifications.

In an example, a preference for an item listing classification option may be identified by user group determiner 122 based on a ratio. The ratio may be compared to a threshold preference value to determine whether the historical user information 132 includes a pattern that indicates a preference for an item listing classification option. For example, a ratio that indicates more interactions (e.g., past purchases or potential purchases) with items having a first item listing classification option than a second item listing classification option indicates a preference for an item listing having the first item listing classification option.

The threshold preference value for an item listing classification option may be predetermined. The threshold preference value may be any percentage, or other numerical representation. For example, the threshold preference value for the ratio may be 0.1%, 1%, 2%, 5%, 10%, 15%, 20%, etc. more of the first item listing classification option than the second item listing classification option. Put another way, if the number of interactions associated with a first item listing classification option exceeds the number of interactions associated with the second item listing classification option by the threshold preference value, then the user may be determined to have a preference for interacting with items that are associated with the first item listing classification option.

Other methods for recognizing patterns within historical user information 132 may be employed. For example, machine learning techniques, rolling averages, trends analyses, clustering analyses, regression analyses, or any other algorithm or method for determining patterns may be employed, and are intended to be within the scope of this description. Based on the determined patterns in the historical user information 132 for an item listing classification option, the user may be determined to have a preference for the item listing classification option.

User preferences for an item listing classification option indicate that the user may continue to act in accordance with the pattern. That is, the preference of the user may predict the types of search results the user will interact with or find relevant in the future. In the context of e-commerce, a user having a preference for new items may be more likely to purchase new items in the future. Therefore, new items would be more relevant to that user than another user having a preference for used items. Likewise, a user having a preference for auction items may be more likely to purchase items at auction in the future. Thus, items selling at auction would be more relevant to that user than another user having a preference for fixed price items.

User group determiner 122 forms user groups based on a plurality of users having a preference, for instance, for an item listing classification option. In this way, the user group is based on or associated with an item listing classification option. Users may be attributed to the user group based on determining a preference of the user, where the preference of the user corresponds to the item listing classification option of the group. That is, a user having a preference for a particular item listing classification option may be attributed to a group of other users also having a preference for the particular item listing classification option. Thus, members of the user group have a common preference for an item listing classification option associated with the user group. Here, the user group is formed from the plurality of users having user preferences corresponding to the item listing classification option associated with the user group.

In some cases, the user groups may be based on two or more item listing classification options. For example, this may occur when there is a correlation between preferences for two item listing classification options. One example would be a correlation between fixed price and new items, while another correlation may be present between auction and used items. In some cases, the user groups may be based on three or more item listing classification options, and so forth.

Any number of user groups may be determined based on any and all combinations of item listing classification options. For example, one user group may be based on a preference for new items. Another user group may be based on preferences for new items and auction items. Yet another user group may be based on preferences for used items and fixed prices. The plurality of user groups may be formed by user group determiner 122 and stored as user group information 134 at search engine database 130. The plurality of user groups may be distinguished based on an item listing classification option associated with each user group of the plurality of user groups.

User group determiner 122 may associate a group search ranker with a group. In this way, the group search ranker is based on the user group, and the user group is based on the group search ranker. In some cases, the group search ranker is specific to the user group it is associated with, meaning that the group search ranker is not associated with any other user group. In some cases, the group search ranker may be associated, in whole or in part, with another user group.

In general, the group search ranker is used to rank search results for members of the user group, as will be further described below. The group search ranker associated with the user group may be weighted to emphasize the item listing classification option of the user group when ranking search results for members of the user group. A group search ranker associated with a user group based on two or more item listing classification options may also be based on two or more item listing classification options and emphasize the two or more item listing classification options when ranking search results. The two or more item listing classification options may be associated with different item listing classifications. Group search rankers may be stored in search engine database 130 as part of search rankers 136.

Search engine 120 may further include user group identifier 124. In general, user group identifier 124 identifies a user group for a user associated with a search query.

In an aspect, user group identifier 124 may identify a user group based on a user previously being attributed to a user group and stored in search engine database 130. As previously discussed, user group determiner 122 may form user groups having a plurality of members (e.g., users). User group identifier 124 may identify a user associated with a search query, for example, by using an IP address, a user name, an identifying input (e.g., the user inputs their name, address, financial card number, etc.), a user profile, or any other data that identifies the user. User group identifier 124 may determine whether the user has been attributed to a user group by user group determiner 122 by referencing stored user group information 134. If the user has been attributed to a user group, then the user group associated with the user may be identified by user group identifier 124.

In another aspect, user group identifier 124 may identify a user group for a user that has not previously been associated with a user group, when the user has enough historical user information to determine user preferences. In this aspect, user group identifier 124 may determine the identity of the user using methods previously described. User group identifier 124 may access stored user group information 134 and determine that the user is not associated with any of the user groups.

In such cases, user group identifier 124 may access stored historical user information 132 to determine if there is enough historical user information about the user to determine preferences. User group identifier 124 may determine user preferences from historical user information associated with the user using methods previously discussed with reference to user group determiner 122. Upon determining there is a user preference for an item listing classification option, the user may be attributed to a user group having members with a common preference for the determined user preference. That is, the user may be attributed to a group based on the user preference for the item listing classification option being the same as the preference for the item listing classification exhibited by the group members.

In another aspect, user group identifier 124 may identify a user group for the user based on user attributes. As previously discussed, user attributes may include any characteristic of the user, such as location, language, age, gender, etc. User group identifier 124 may identify a user group based on user attributes when there is no historical user information about the user or the historical user information associated with the user does not support the determination of user preferences from patterns.

User group identifier 124 may identify attributes about the user, for example, by receiving attributes from the user, such as a stored user profile, determined or inferred from user interactions, or received from any component of search system 100.

Further, user group identifier 124 may determine common attributes within group members of user groups. For example, user group identifier 124 may access stored user group information 134. User group identifier 124 may identify users associated with a particular user group. User group identifier 124 may access or receive additional attribute information about the users that are members of the particular group. Based on this, user group identifier 124 may determine whether there is a significant (e.g., a statistically significant) correlation between a user attribute and the user group. As an example only, user group identifier 124 may determine that there is a statistically significant correlation between the age attribute 30-40 and purchasing new items. Using another example, user group identifier 124 may determine that there is a correlation between the age attribute 20-30 and purchasing auction items.

Based on an attribute identified as significant for a user group and an attribute identified for the user associated with the search query, the user may be attributed to the user group. Said differently, the user may be attributed to a user group that comprises a plurality of users having an attribute corresponding to the attribute of the user.

In some cases, attributing users to user groups based on attributes is temporary. By temporary, it is meant that the user may be associated with the user group based on the attributes until there is enough historical user information to attribute the user to a user group based on a preference for an item listing classification option. If a preference for an item listing classification option for the user is later determined, then the user may be attributed to a different user group based on the determined preference. In this case, the user may be removed from its current group and attributed to another group having and associated item listing classification option that corresponds to the determined preference of the user.

It will be appreciated that, given the number of attributes any given user may have, along with the number of statistically significant correlations between group member attributes and a user group, identifying the user group based on attributes may be a complex task. As such, one method that may be employed to reduce this complexity and more accurately predict a user group for a user based on attributes is to use vector space comparisons. Here, attributes of a user may be represented by a vector (i.e., a user attribute vector), while attributes associated with the plurality of user groups within stored user group information 134 may also be represented by a vector (i.e., a group attribute vector). The user attribute vector may be compared to the group attribute vector, and the vector distance determined. The user may be attributed to the user group having the shortest vector distance based on the comparison.

Search engine 120 also comprises item listing retriever 126. In general, item listing retriever may identify stored item listings related to the search query. Item listing retriever 126 may identify item listings stored at search engine 120, such as at search engine database 130, or item listings stored remotely, such as at remote database 115. Item listing retriever 126 may recall the identified relevant item listings.

Continuing with previous examples, item listing retriever 126 may identify a set of item listings (i.e., search results) for a search query entered by a user. As noted, the item listings may be associated with items for sale. The set of item listings may be identified based on their relevancy to the search query. Item listings may be stored remotely (e.g., a third-party seller), such as remote item listings 117 stored on remote database 115. Item listings may be stored at search engine 120 (e.g., a first-party seller), such as search engine item listings 138 stored on search engine database 130. The set of item listings may include a plurality of item listings.

To identify an item listing, item listing retriever 126 may determine the relevancy of the item listing to the search query. Item listing retriever 126 may determine relevancy based on words common between the search query and an item listing. Item listing retriever 126 may use query expansion on the search query to identify additional search criteria for determining relevancy. For example, a search query may be expanded to include synonyms of keywords within the search query. The item listings may be identified as relevant based on common keywords and keyword synonyms. In some cases, item listing retriever 126 may use vector space searching to determine whether an item listing is relevant to the search query. It will be appreciated that any method for determining relevancy of a stored item listing to a search query may be used.

Search engine 120 is shown having ranker 128. While shown as separate components, in some aspects, the functions of ranker 128 may be performed by item listing retriever 128. Said differently, in an aspect, item listing retriever 126 and ranker 128 are combined into one component, while in another aspect, item listing retriever 126 and ranker 128 are separate components.

Ranker 128 may be employed by search engine 120 to rank the set of search results (e.g., item listings) identified and recalled by item listing retriever 126. To rank the set of search results, ranker 128 may use different rankers for different search queries. For instance, for some search queries, ranker 128 may use a group search ranker, such as a group search ranker of stored search rankers 136, which is associated with a user group. For some search queries, ranker 128 may use a generic search ranker to rank the set of search results. The generic search ranker may be predetermined and included in stored search rankers 136 of search engine database 130. For other search queries, ranker 128 may employ a combination of the generic search ranker and the group search ranker to rank the set of search results.

As discussed, the group search ranker is associated with a user group. Ranker 128 may retrieve the group search ranker that is associated with the user group identified by user group identifier 124.

In general, a group search ranker is a ranking algorithm. In an embodiment, the group search ranker may be applied to the set of search results to score each search result of the set based on a set of weighted variables. The weighted variables may include, for example, a relevance of the item listing to the search query and a preference for an item listing classification option. The variable for a preference for an item listing classification option may be called an item listing classification option variable. It will be understood that other variables may be included in the group search ranker, though they are not discussed in detail here for brevity.

The group search ranker may include a preference weight associated with the item listing classification option variable. The preference weight generally determines the degree to which the item listing classification option affects the ranking when the search ranker is applied to the set of search results (e.g., item listings). For example, the search ranker may be weighted to emphasize the item listing classification option. Put another way, the preference weight for the item listing classification option may emphasize the ranking of search results having an item listing associated with the item listing classification option over search results having a different item listing classification option. For example, by emphasizing a first item listing classification option over a second item listing classification option, a first search result associated with the first item listing classification will tend to be ranked higher than a second search result associated with the second item listing classification option.

However, while the group search ranker may be weighted to emphasize an item listing classification option, the final ranking of the search result within the set of search results may be determined by the overall group search ranker and weights applied to other variables in the group search ranker. For instance, a group search ranker weighted to emphasize a first item listing classification option may rank a first search result associated with the first item listing classification option lower than a second search result that is associated with a second item listing classification option not emphasized by the group search ranker, when the second item listing has a strong relevance to the search query.

The group search ranker may be applied to each search result of the set of search results to determine a numerical score for each search result. The numerical score may reflect the weights applied to the variables within the group search ranker. For example, where a group search ranker is weighted to emphasize an item listing classification option, those search results associated with the item listing classification option may be scored higher because of the preference weight applied to the item listing classification option variable. The set of search results may be ranked based on the numerical score.

In addition to the group search ranker, ranker 128 may rank the set of search results using a generic search ranker. In general, the generic search ranker may include criteria or variables for ranking the set of search results that are not dependent on the user. For example, the generic search ranker may rank the set of search results based on user-independent criteria. Thus, a generic search ranker variable may be user-independent. The generic search ranker variable may be independent of the item listing classification option, meaning that the item listing classification option does not affect the ranking based on the generic search ranker. As noted, the generic search ranker may be predetermined, i.e., a predetermined generic search ranker variable weight.

For example, with continued reference to the e-commerce context, the variables of the generic search ranker may include trust of the seller (e.g., how many items the seller has sold or a seller feedback rating), relevance between the search query and the item listing, and likelihood of conversion.

The generic search ranker may initially rank the set of search results (e.g., item listings in the e-commerce context). Thus, the initial ranking may include a ranking of the set of search results based on user-independent criteria. In some cases, the group search ranker, which may include user-dependent criteria based on the user's affiliation with the user group, may re-rank the initial ranked set of search results so that the ranked set of search results includes the user-dependent factors, such as a preference for a specific item listing classification option.

Having ranked the set of search results retrieved by item listing retriever 126 using ranker 128, search engine 120 may provide the ranked set of search results to the computing device 105 for presentation of the ranked set of search results to a user using an interface of computing device 105.

Figure 2:
FIG. 2 is an illustration of a Graphical User Interface (GUI) having example search results provided by a search engine using a group search ranker, in accordance with aspects described herein.

An example of a ranked set of search results determined by search engine 120 is provided in FIG. 2. FIG. 2 is an illustration of GUI 200 that includes a visual presentation of a search engine website associated with a search engine. The search engine website illustrated includes search query 205, search results for search query 205 are shown as item listings 210. Item listings 210 may be provided in response to entering search query 205.

As an example, item listings 210 may be identified and ranked by the search engine (for example, search engine 120 of FIG. 1). In the example illustration of FIG. 2, the search engine has provided a ranked list of a set of at least three hundred item listings, ten of which are illustrated on GUI 200. Here, item listings 210 have been ranked by the search engine to emphasize the item listing classification option "Auction," for example item listing classification option 215. As such, the first ten item listings 210 presented to the user on GUI 200 include auction items. It is contemplated that, for this example, fixed price items would be included among the set of at least three hundred item listings; however, they do not appear in the first ten item listings 210 because there are at least ten item listings at auction that are ranked higher than the highest ranked item listing associated with a fixed price item listing classification option.

Figure 3:
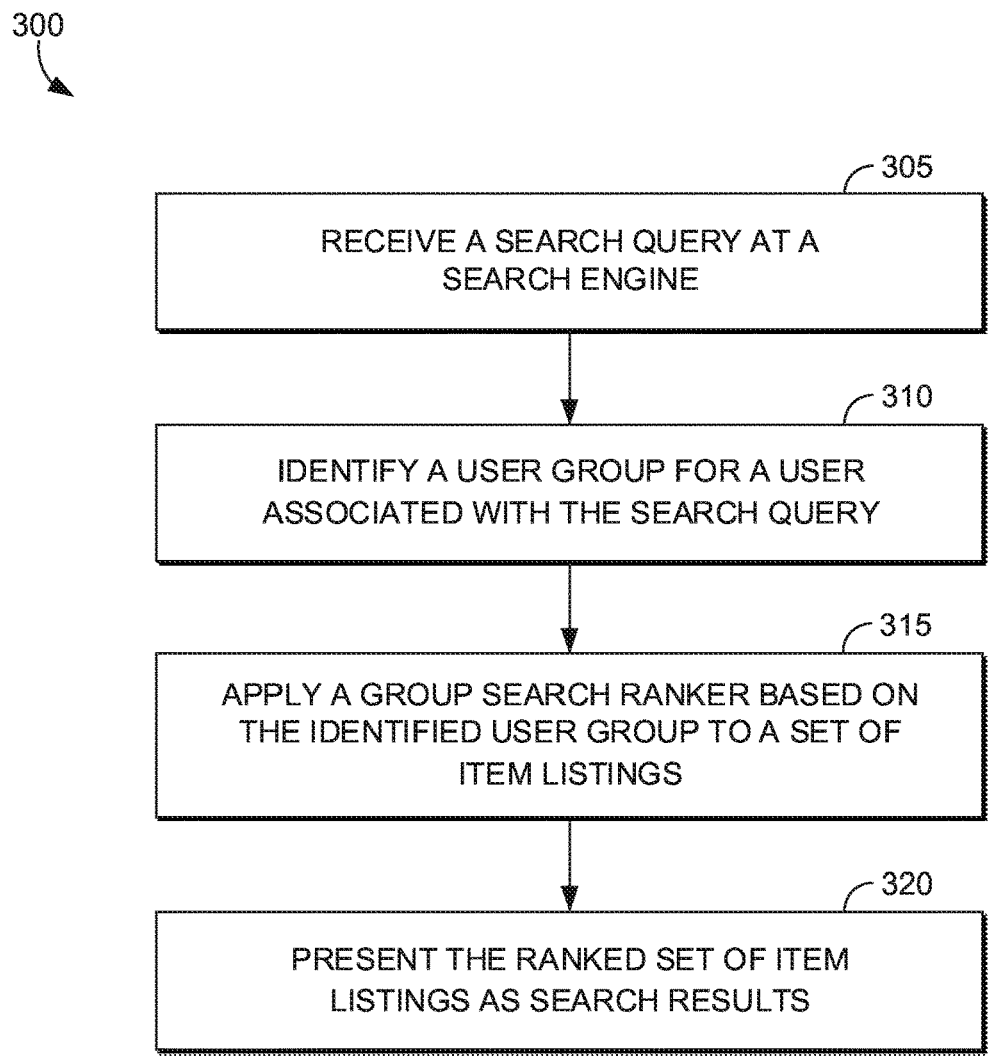
FIGS. 3-5 are block diagrams illustrating example methods for customizing search results using a group search ranker, in accordance with aspects described herein.
Figure 4:
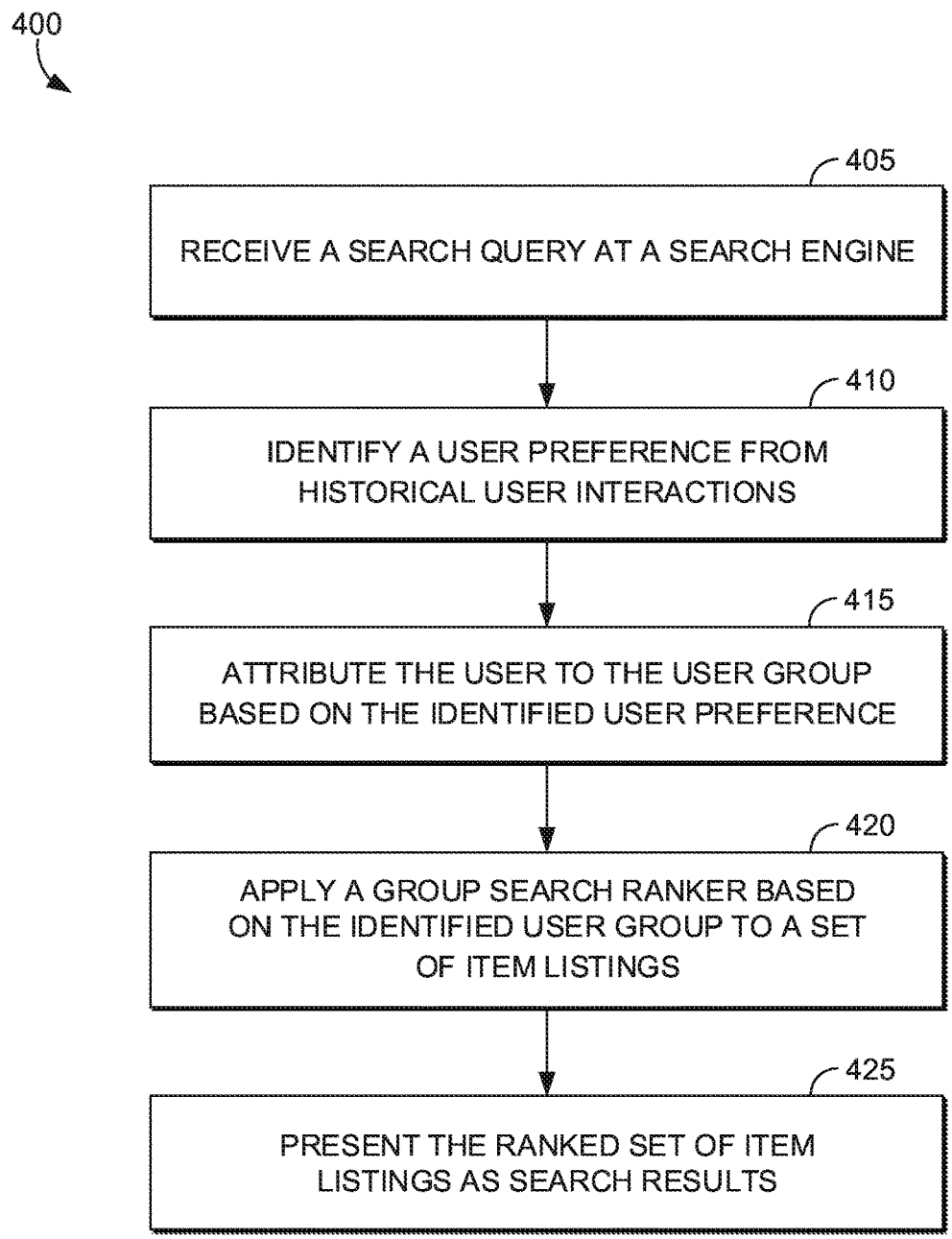
Figure 5:
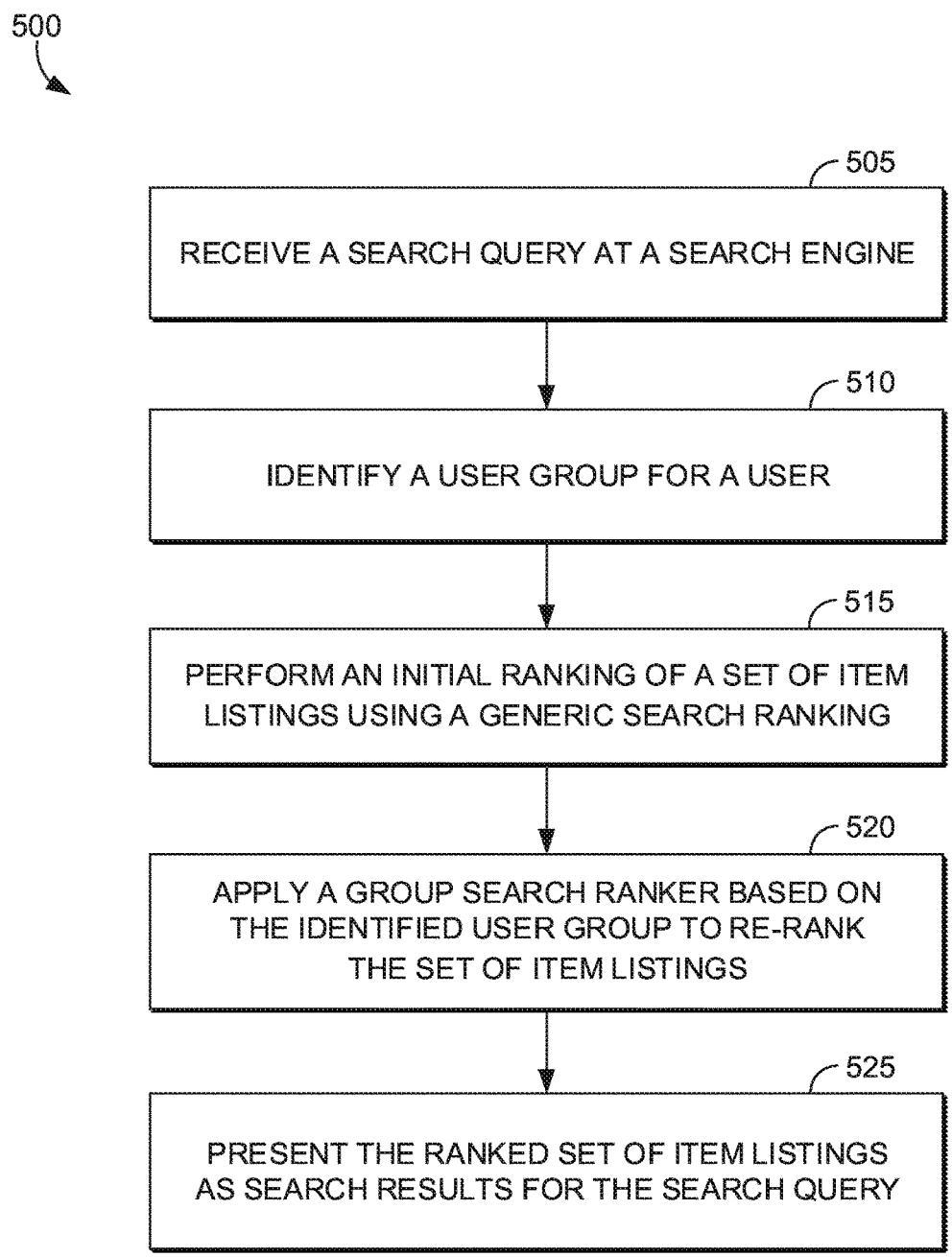

With reference to FIGS. 3, 4, and 5, block diagrams are provided to illustrate methods for customizing search results. The methods may be performed using a search system. In embodiments, one or more computer storage media having computer-executable instructions embodied thereon that, when executed, by one or more processors, cause the one or more processors to perform the methods in the search system.

With reference now to FIG. 3, a block diagram is provided illustrating example method 300 for customizing search results. At block 305, a search query is received. The search query may be received at a search engine, such as search engine 120 of FIG. 1, from a user entering the search query, for instance, at an associated search engine website. At block 310, a user group for the user is identified. For example, the user group may be identified using user group identifier 124 of FIG. 1. The user group may be identified based on: (1) the user's predetermined affiliation with the group; (2) the user's learned preferences for an item listing classification option; or (3) the user's attributes. The user group may have been formed from a plurality of users having user preferences for the item listing classification option of an item listing classification.

At block 315, a group search ranker based on the identified user group is applied to rank a set of item listings. The item listings may be identified and retrieved by item listing retriever 126 of FIG. 1 in response to the search query. The group search ranker may be applied by ranker 128 of FIG. 1. The group search ranker may be associated with the user group. The group search ranker may be weighted to emphasize the item listing classification option of the user group. An item listing classification associated with the item listing classification option may include condition, format, or both. At block 320, the ranked set of item listings is provided as search results for presentation at a client computing device.

With reference now to FIG. 4, a block diagram is provided illustrating example method 400 of customizing search results. At block 405, a search query is received. The search query may be received at a search engine from a user. At block 410, a user preference is identified from historical user interactions. In an example, the user preference is identified by determining that a ratio between at least two item listing classification options for an item listing classification exceeds a threshold preference value. At block 415, the user may be attributed to the user group based on the identified user preference. The user preference may be common between the user and members of the group. The user group may have been formed from a plurality of users having user preferences corresponding to the identified user preference for the user associated with the search query.

At block 420, a group search ranker based on the identified user group is applied to rank a set of item listings identified for the search query. The group search ranker may be weighted to emphasize the item listing classification of the user group. At block 425, the ranked set of item listings is provided as search results to the user, for example, by communicating the ranked set of item listings to a computing device for presentation.

With reference now to FIG. 5, FIG. 5 is a block diagram illustrating example method 500 of customizing search results. At block 505, a search query is received at a search engine. At block 510, a user group is identified for a user associated with the search query. At block 515, an initial ranking is performed for a set of item listings using a generic search ranker. The set of item listings may be identified based on the search query. The generic search ranker may be independent of user preferences and may be independent of the item listing classification option associated with the user group.

At block 520, a group search ranker is applied to rank the set of item listings. The group search ranker may be based on the identified user group and based on the item listing classification option of the identified user group. The group search ranker may re-rank the set of item listings ranked by the generic search ranker. At block 525, the ranked set of item listings is provided as search results to the user, for example, by communicating the ranked set of item listings to a computing device for presentation.

Figure 6:
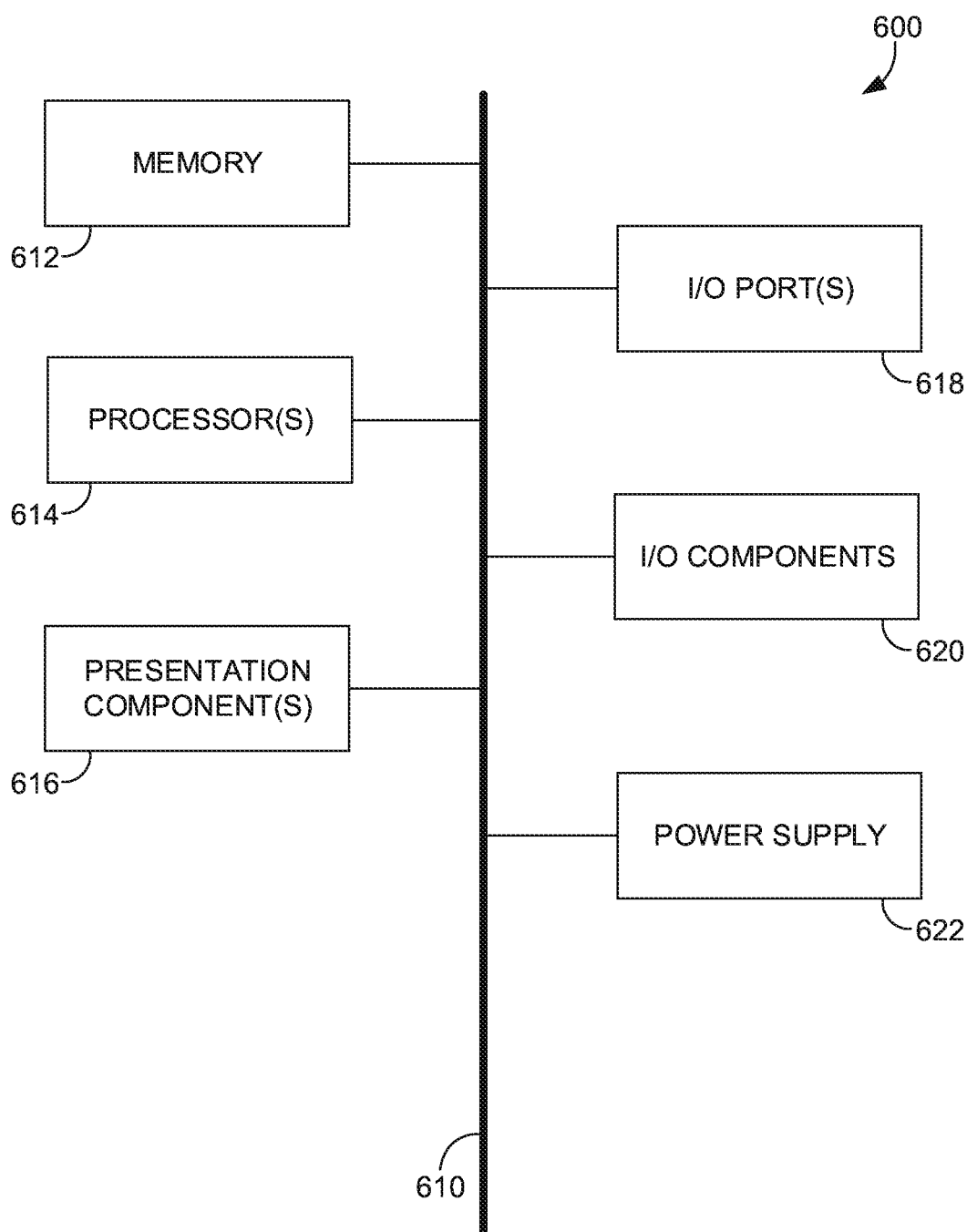
FIG. 6 is a block diagram of an example computing environment suitable for use in implementing aspects described herein.

Having described an overview of embodiments of the present technology, an example operating environment in which embodiments of the present technology may be implemented is described below in order to provide a general context for various aspects of the present technology. Referring initially to FIG. 6, in particular, an example operating environment for implementing embodiments of the present technology is shown and designated generally as computing device 600. Computing device 600 is but one example of a suitable computing environment and is not intended to suggest any limitation as to the scope of use or functionality of the technology. Neither should computing device 600 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrates an example computing device that can be used in connection with one or more embodiments of the present technology. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile or nonvolatile memory. The memory may be removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Examples of presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. One or more computer storage media having computer-executable instructions embodied thereon that, when executed by one or more processors, cause the one or more processors to perform a method for customizing search results, the method comprising:
   receiving a search query at a search engine;
   identifying a user group for a user associated with the search query;
   applying a group search ranker based on the identified user group to a set of item listings associated with an item listing classification comprising item listing classification options, the group search ranker ranking item listings within the set of item listings, wherein the user group is formed based on members having a common preference for an item listing classification option of the item listing classification; and
   providing the ranked set of item listings for presentation as search results for the search query.

2. The one or more computer storage media of claim 1, wherein the group search ranker based on the user group is weighted to emphasize the item listing classification option.

3. The one or more computer storage media of claim 1, further comprising:
   identifying the set of item listings from an item listing database using the search query; and
   performing an initial ranking of the set of item listings using a generic search ranking, wherein the group search ranker re-ranks the item listings within the set of item listings.

4. The one or more computer storage media of claim 1, wherein identifying the user group further comprises:
   identifying a user preference for the user from historical user interactions with the search engine, the user preference identified by determining that a ratio between at least two item listing classification options for the item listing classification exceeds a threshold preference value; and
   attributing the user to the user group based on the identified user preference, the user group formed from a plurality of users having user preferences corresponding to the identified user preference.

5. The one or more computer storage media of claim 1, wherein identifying the user group further comprises determining one or more user attributes for the user, and based on the one or more user attributes, attributing the user to the user group, the user group comprising a plurality of users having attributes corresponding to the one or more user attributes.

6. The one or more computer storage media of claim 1, wherein the item listing classification comprising item condition or item purchase format.

7. A computer-implemented method performed by one or more processors for customizing search results, the method comprising:
- receiving a search query at a search engine;
- identifying a user group for a user associated with the search query, the user group identified from among a plurality of user groups distinguished based on an item listing classification option for an item listing classification, wherein the user group is formed based on members having a common preference for the item listing classification option for the item listing classification;
- applying a group search ranker based on the user group, the group search ranker ranking item listings within a set of item listings to provide a ranked set of item listings, wherein the group search ranker ranks the item listings based on the item listing classification option associated with the user group; and
- providing the ranked set of item listings as search results for the search query.

8. The computer-implemented method of claim 7, wherein the group search ranker based on the user group is weighted to emphasize the item listing classification option.

9. The computer-implemented method of claim 7, further comprising performing an initial ranking of the set of item listing using a generic search ranker, the generic search ranker ranking the set of item listings using a generic search ranker variable that is independent of the item listing classification option.

10. The computer-implemented method of claim 9, wherein the group search ranker re-ranks the item listings within the set of item listings ranked by the generic search ranker to provide the ranked set of item listings.

11. The computer-implemented method of claim 7, wherein identifying the user group further comprises:
- identifying a user preference for the user from historical user interactions with the search engine, the user preference associated with the item listing classification option; and
- attributing the user to the user group based on the identified user preference, the user group formed from a plurality of users having user preferences corresponding to the identified user preference.

12. The computer-implemented method of claim 7, wherein identifying the user group further comprises determining user attributes for the user, and based on a user attribute, attributing the user to the user group, the user group comprising a plurality of users having attributes corresponding to the user attribute.

13. The computer-implemented method of claim 7, wherein the item listing classification comprises item condition or item purchase format, the item listing classification for the item condition comprising at least two item listing classification options that include new and used, the item listing classification for the item purchase format comprising at least two item listing classification options that include auction and fixed price.

14. The computer-implemented method of claim 7, wherein the group search ranker is based on two or more item listing classification options, the two or more item listing classification options associated with different item listing classifications.

15. A search system for customizing search results, the system comprising:
- one or more processors; and
- one or more computer storage media storing computer-useable instructions that, when used by the one or more processors, cause the one or more processors to:
  - receive a search query at a search engine;
  - identify a user group for a user associated with the search query, the user group identified from among a plurality of user groups distinguished based on an item listing classification option for an item listing classification, wherein the user group is formed based on members having a common preference for the item listing classification option for the item listing classification;
  - apply a group search ranker based on the user group, the group search ranker ranking item listings within a set of item listings to provide a ranked set of item listings, wherein the group search ranker ranks the item listings based on the item listing classification option of the user group; and
  - provide the ranked set of item listings as search results for the search query.

16. The search system of claim 15, wherein the set of item listings is determined using a generic search ranker, the generic search ranker ranking the set of item listings, wherein the group search ranker re-ranks the item listings of the ranked set of item listings.

17. The search system of claim 15, wherein the group search ranker based on the user group is weighted to emphasize the item listing classification option.

18. The search system of claim 15, wherein the one or more processors further identify the user group based on a historical user preference of the user for the item listing classification option associated with the user group.

* * * * *